(12) United States Patent
Westin et al.

(10) Patent No.: US 7,363,418 B1
(45) Date of Patent: Apr. 22, 2008

(54) DATA STORAGE SYSTEM VOLUME MATRIX

(75) Inventors: Vincent H. Westin, Marietta, GA (US); David L. Black, Acton, MA (US)

(73) Assignee: EMC Corporation, Hopkinton, MA (US)

( * ) Notice: Subject to any disclaimer, the term of this patent is extended or adjusted under 35 U.S.C. 154(b) by 279 days.

(21) Appl. No.: 11/237,051

(22) Filed: Sep. 28, 2005

(51) Int. Cl.
G06F 3/06 (2006.01)
(52) U.S. Cl. .......................................... 711/4
(58) Field of Classification Search ............... 711/4
See application file for complete search history.

(56) References Cited

U.S. PATENT DOCUMENTS

| | | | | |
|---|---|---|---|---|
| 6,167,459 | A * | 12/2000 | Beardsley et al. | 710/3 |
| 6,170,023 | B1 * | 1/2001 | Beardsley et al. | 710/36 |
| 6,185,638 | B1 * | 2/2001 | Beardsley et al. | 710/36 |
| 6,240,467 | B1 * | 5/2001 | Beardsley et al. | 710/5 |
| 6,526,521 | B1 | 2/2003 | Lim | 714/4 |
| 6,622,177 | B1 * | 9/2003 | Eilert et al. | 710/3 |
| 7,143,228 | B2 * | 11/2006 | Iida et al. | 711/4 |

OTHER PUBLICATIONS

IBM TotalStorage Enterprise Storage Server Model 800, By Gustavo Castets et al., IBM, 2002, Sections 6.2.0-6.2.12.*
IBM Corporation, "How to Improve Performance with PAV," Jul. 30, 2004, http://download.boulder.ibm.com/ibmdl/pub/software/dw/linux390/docu/lx26pav00.pdf.
EMC Corporation, "Path fault with EMC Full Time PowerPath," 2005, http://www.emc.com/products/software/powerpath.jsp.
Argonne National Laboratory, Apr. 2003, "GridFTP: Protocol Extensions to FTP for the Grid," http://www.ggf.org/documents/gfd.20.pdf.
J. Satran, et al., "Internet Small Computer Systems Interface (iSCSI)," Apr. 2004, pp. 1-47; 66-73; 81-81; 105-111; http://www.ietf.org/rfc/rfc3720.txt.

* cited by examiner

Primary Examiner—Matthew Kim
Assistant Examiner—John P Fishburn
(74) Attorney, Agent, or Firm—BainwoodHuang

(57) ABSTRACT

A volume matrix is established including host devices on a host computer and virtual devices and logical devices on a data storage system. Each host device/virtual device (H/V) pair has a user-visible primary address range to serve as a primary H/V pair on a primary path for a logical device, and selected H/V pairs also have one or more user-hidden secondary address ranges to serve as secondary H/V pairs on secondary paths for other logical devices. The host computer directs storage requests to either the primary path or a secondary path to a target logical device based on expected performance criteria, and if a secondary path is used then the address is translated to the correct secondary address range. The data storage system performs the storage request on the target logical device after determining whether the request was received on the primary path or a secondary path, in which case the storage address is further translated to an address range of the target logical device. The secondary address ranges create secondary paths to reduce queuing-related delays without requiring inefficient duplication of system resources.

20 Claims, 6 Drawing Sheets

DATA STORAGE SYSTEM VOLUME MATRIX

BACKGROUND

The invention is related to the field of data storage systems.

Modern computer systems commonly employ a so-called "open" storage architecture in which data storage is concentrated in specialized data storage systems that are separate from host computer systems for which the data storage is provided. This approach is in contrast to architectures in which data storage is tightly coupled to the hosts, using for example proprietary storage interconnect buses and protocols. Open data storage architectures typically employ standardized storage-oriented buses such as Fibre Channel and specialized networks referred to as "storage area networks" or SANs.

In computer systems utilizing an open storage architecture, storage requests generated by application programs within a host computer are transmitted to the data storage system via a storage bus and/or SAN. The host operating system maintains a host-oriented definition of a remote storage device, such as region of a disk drive located in the data storage system, and the data storage system presents an interface to the remote storage device. For the sake of the present description, the host-oriented definition is referred to as a "host device"; the remote storage device as a "logical device", and the interface presented by the data storage system a "virtual device". When an application program generates a storage request such as a request to read or write part of a file to/from a host device, the host operating system issues a corresponding request directed to the corresponding virtual device of the data storage system in which the data is stored. The data storage system then performs the operation on the corresponding logical device. In the case of a read operation, the data storage system returns the requested data to the host computer. Some data storage systems employ a cache of semiconductor memory in order to reduce average data access times. Such data storage systems may be known as "integrated cache/disk arrays" or ICDAs such as sold by EMC Corporation under the trademark Symmetrix®.

Host computers typically employ queues associated with the remote storage devices that they access, these queues being used to temporarily hold storage requests that are either being processed or are waiting to be processed by the target data storage system. Generally, the queued storage requests are performed in the order in which they are placed on the queue. The queues help the operating system manage the processing of a potentially large number of storage requests. However, the queues can contribute to the delay experienced by storage requests. This delay can become significant when the queue for a storage device fills up, which may occur when the rate at which storage requests are generated is greater than the storage device can handle. The delay can also be significant under certain operating conditions when the data storage system employs a cache. A given storage request that might be a cache "hit" (i.e., data is residing in the cache) may be preceded by another storage request that is a cache "miss" (i.e., data not residing in the cache). In this case, the cache hit request must wait for the cache miss to be completed before the cache hit can be sent to the data storage system, potentially increasing its delay by an order of magnitude or more. It is desirable to avoid such delays in the interest of improved system performance.

There are known techniques aimed at reducing queuing-related delays of the type described above. In one approach, multiple host queues and paths are defined for a target logical device residing in a remote data storage system, and software in the host operating system selects among the host queues/paths for the storage requests based on performance criteria. Thus if one queue/path to a logical device is busy when a new storage request is generated within the host, the operating system may place the new storage request on a second queue that is relatively idle. In this way, the average delay for storage requests can be reduced, especially cache hits occurring in the vicinity of cache misses. This technique generally requires duplication of resources both at the host and the data storage system. Each additional path may require its own set of physical ports on the host and/or data storage system, or at least its own set of software mechanisms on the host and/or data storage system to implement the independent additional paths. The duplication is repeated for each target logical device that may be the target of a relatively high rate of storage requests.

SUMMARY

Prior techniques for performing data storage operations in computer systems having open storage architectures have exhibited certain disadvantages, such as the undesirable delay associated with single queues/paths to logical devices that are the targets of storage requests, and inefficiency and poor scalability when multiple independent queues/paths to target logical devices are employed. It would be desirable to achieve the performance benefits of reduced delay while avoiding the inefficiency and scalability disadvantages of known techniques.

In accordance with the present invention, methods and apparatus are disclosed for performing data storage operations between a host computer and a data storage system in an improved manner. Multiple alternative paths to a particular logical device are utilized, thus avoiding the bottleneck of a single path, but the paths are used in a way that makes efficient use of hardware and software resources.

A volume matrix is established including host devices on the host computer and virtual devices and logical devices on the data storage system. Each host device is mapped to a corresponding virtual device creating a corresponding host device/virtual device (H/V) pair. Each H/V pair has a user-visible primary address range by which it serves as a primary H/V pair on a primary path for a corresponding logical device, and each of selected H/V pairs also has one or more user-hidden secondary address ranges and serves as a secondary H/V pair on secondary path(s) for other logical device(s).

During operation, when a storage request occurs at the host computer directed to a primary H/V pair for a target logical device, the host computer (a) directs the storage request along a selected one of the primary path and secondary paths to the target logical device based on expected performance criteria, and (b) upon directing the storage request along a selected secondary path, performs a first translation of the storage address to the secondary address range of the H/V pair of the selected secondary path. In response to receiving the storage request from the host computer, the data storage system (a) performs the storage request on the target logical device using the storage address of the storage request, if the storage request was received on the primary path for the target logical device, and (b) if the storage request was received on the selected secondary path for the target logical device, then (i) performs a second translation of the storage address to an address range of the target logical device, and (ii) performs the storage request on the target logical device using the reverse-translated storage address.

By mapping address ranges of the H/V pairs to the logical devices, one or more secondary paths to a given logical device can be created so that the performance bottlenecks associated with a single path are avoided. Additionally, the secondary address ranges are merely extensions of H/V pairs that are also used to provide primary access to data stored on the data storage system, and thus the system requires only incrementally more hardware and software resources to support the disclosed technique, in contrast to prior approaches in which such resources are duplicated in an inefficient fashion.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
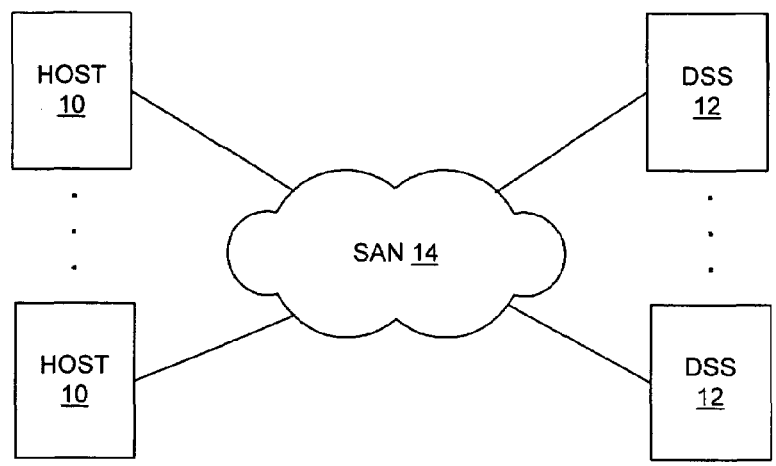
FIG. 1 is a block diagram of a computer system having host computers and data storage systems in accordance with an embodiment of the present invention.

FIG. 1 shows a computer system having a plurality of host computers (hosts) 10 connected to a plurality of data storage systems (DSSs) 12 in a storage area network (SAN) 14. The hosts 10 generally execute any of a variety of applications having storage requirements, such as Web server applications for a large Web site, database server applications, etc. The DSSs 12 are specialized devices (described further below) providing data storage functionality for the hosts 10 via the SAN 14. The SAN 14 includes high-speed interconnections and switches (not shown) that implement storage-related communications according to recognized standards, such as Fibre Channel for example, enabling flexible and scalable deployment of storage resources such as DSSs 12 to meet system needs. It should be noted that the SAN 14 is an example of a storage connectivity model, and in alternative embodiments other connectivity methods including standard Small Computer System Interconnect (SCSI) cables and Internet SCSI (iSCSI) can be employed.

Figure 2:
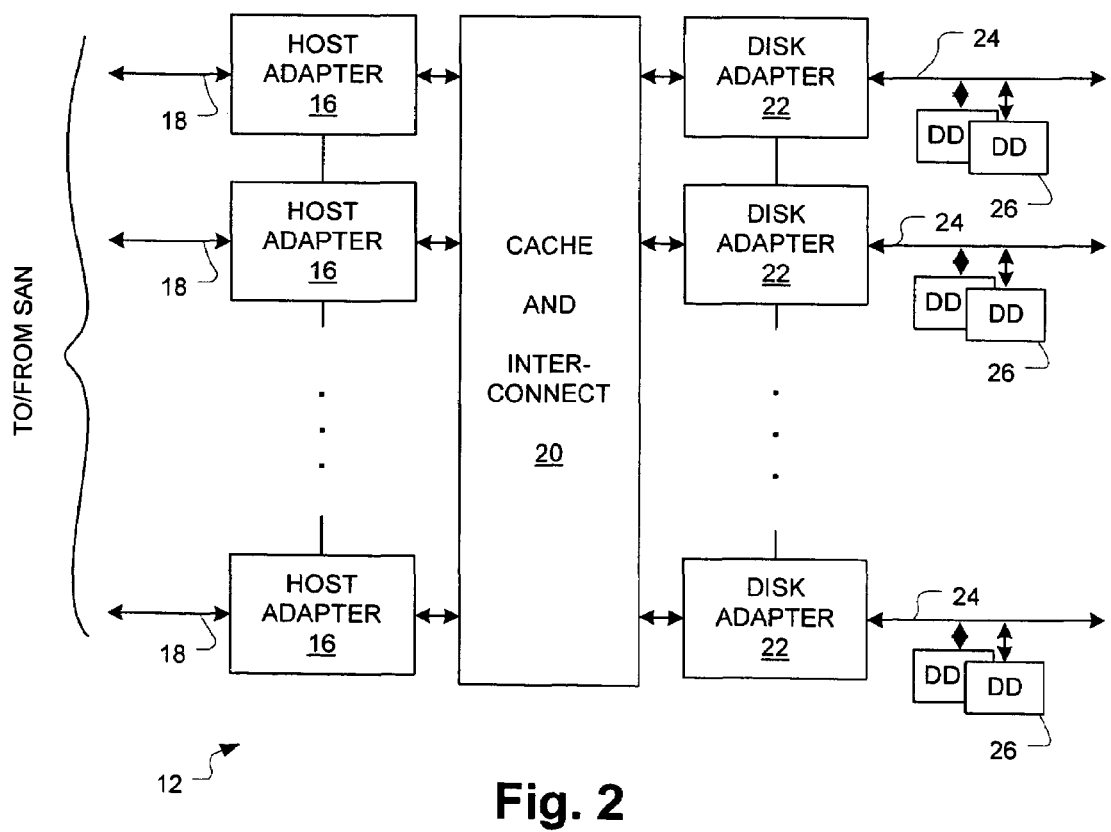
FIG. 2 is a block diagram of a data storage system in the computer system of a FIG. 1.

FIG. 2 shows a DSS 12. The DSS 12 is coupled to the SAN 14 (FIG. 1) via respective host adapters 16 and interconnect buses 18, such as Fiber Channel or other high-speed storage interconnect buses. The host adapters 16 are coupled to a cache and interconnect block 20, which in turn is coupled to disk adapters 22. Each disk adapter 22 interfaces to one or more storage buses 24 to which a plurality of disk drives (DD) 26 are connected. The storage buses 24 may be Small Computer System Interconnect (SCSI) buses for example. In the illustrated embodiment, the DSS 12 may be referred to as an "integrated cache-disk array" or ICDA. An example of such an ICDA DSS 12 is a Symmetrix® storage system sold by EMC Corporation. In alternative embodiments, other types of data storage systems may be employed, including data storage systems of generally greater simplicity than shown in FIG. 2. An example of such a storage system is a CLARiiON® storage system also sold by EMC Corporation.

Figure 3:
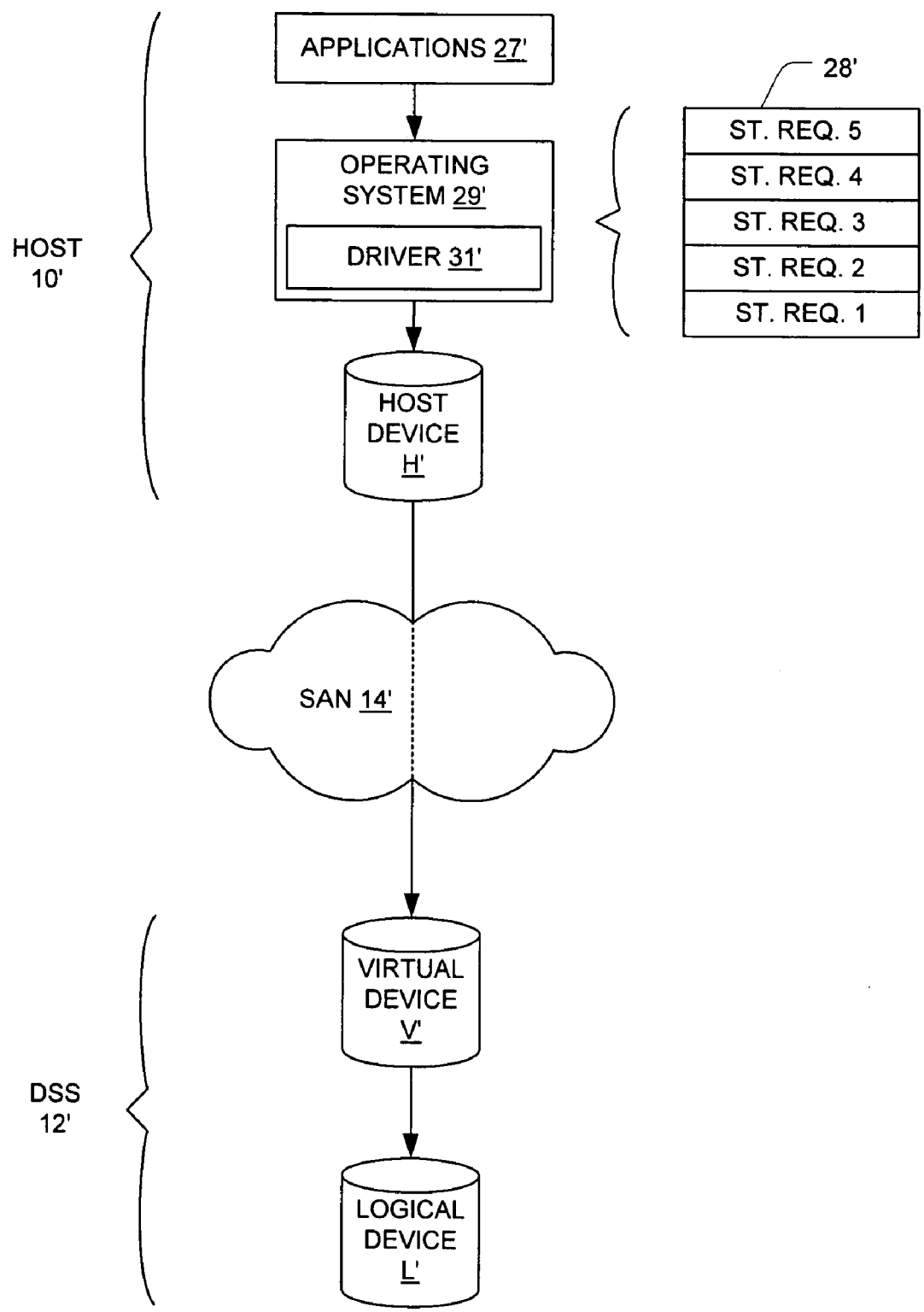
FIG. 3 is a block diagram describing the flow of a data storage operation between a host computer and a data storage system as known in the art.

FIG. 3 is a schematic illustration of the manner in which storage requests/operations are handled in prior-art computer systems having distributed storage. A host computer 10' includes application programs or applications 27' and an operating system 29' which further includes a device driver (DRIVER) 31' for a host device H', which is described below. During operation, the applications 27' generate storage requests directed to a host device H'. The storage requests are passed to the operating system 27' and carried out by the device driver 31'. The operating system 29' includes a request queue 28' for the storage requests directed to the host device H'.

The host device H' is a host-oriented logical representation of a unit of data storage which happens to physically reside across the SAN 14' in a DSS 12'. In a common example, the host device H' is a storage volume that may be labeled by the host operating system with a device label such as "C:". The host device H' interacts with the host operating system 29' in the same manner as a local physical disk while hiding the underlying details of the SAN 14' and DSS 12', and further includes functionality for interacting with the SAN 14' and DSS 12' to carry out storage operations requested by the applications 27'. From the perspective of the host operating system 29', the host device H' may be seen as a SCSI logical unit, for example.

The storage functionality within the DSS 12' is separated into two logical entities, a virtual device V' and a logical device L'. The virtual device V' is essentially the counterpart of the host device H' —it is a logical representation or interface to a storage volume that is presented to the host 10' while hiding the details of operation of the DSS 12'. It may appear to the host 10' as a SCSI logical unit, for example. The logical device L' represents a unit of physical storage within the DSS 12', which may be for example a range of storage addresses of a Redundant Array of Independent Disks (RAID) group defined within the DSS 12'. In the illustrated example, the logical device L' is visible outside the DSS 12' as the virtual device V'.

In operation, the host 10' places storage requests directed to host device H' (which maps to logical device L' on the DSS 12') on the queue 28', from which they are generally executed in order. In the illustrated example, storage requests (ST. REQ.) 1 through 5 are shown. The host device H' processes each storage request fully before processing the next storage request in the queue 28'. Thus storage request 1, which may be a first read request, will be completed before storage request 2, which may be a second read request, is begun.

The arrangement of FIG. 3 has a notable performance drawback, especially when the DSS 12' is a cached storage array. Generally, each storage request experiences undesirable delay associated with waiting in the queue 28' for other storage requests to finish. This delay can be especially significant if the data for a storage request resides in the cache of the DSS 12' (i.e., is a cache "hit") but the data for a preceding storage request(s) does not (i.e., is a cache "miss"). In that case, the cache hit storage request must wait for the processing of one or more cache misses for preceding storage requests, which may increase the delay experienced by the cache hit storage request by one or more orders of magnitude.

It is noted that there may be an independent higher-level process that may place the storage requests into the queue 28' in an order different from the order in which they are generated by the application programs 27'. Although in some cases this re-ordering can reduce the overall delay experienced by the storage requests, in general it does not entirely eliminate the problem of excessive delay in an arrangement such as FIG. 3. It will be further appreciated that the problem of excessive delay becomes worse as the queue 28' becomes deeper during operation (i.e. holds more storage requests on average).

Figure 4:
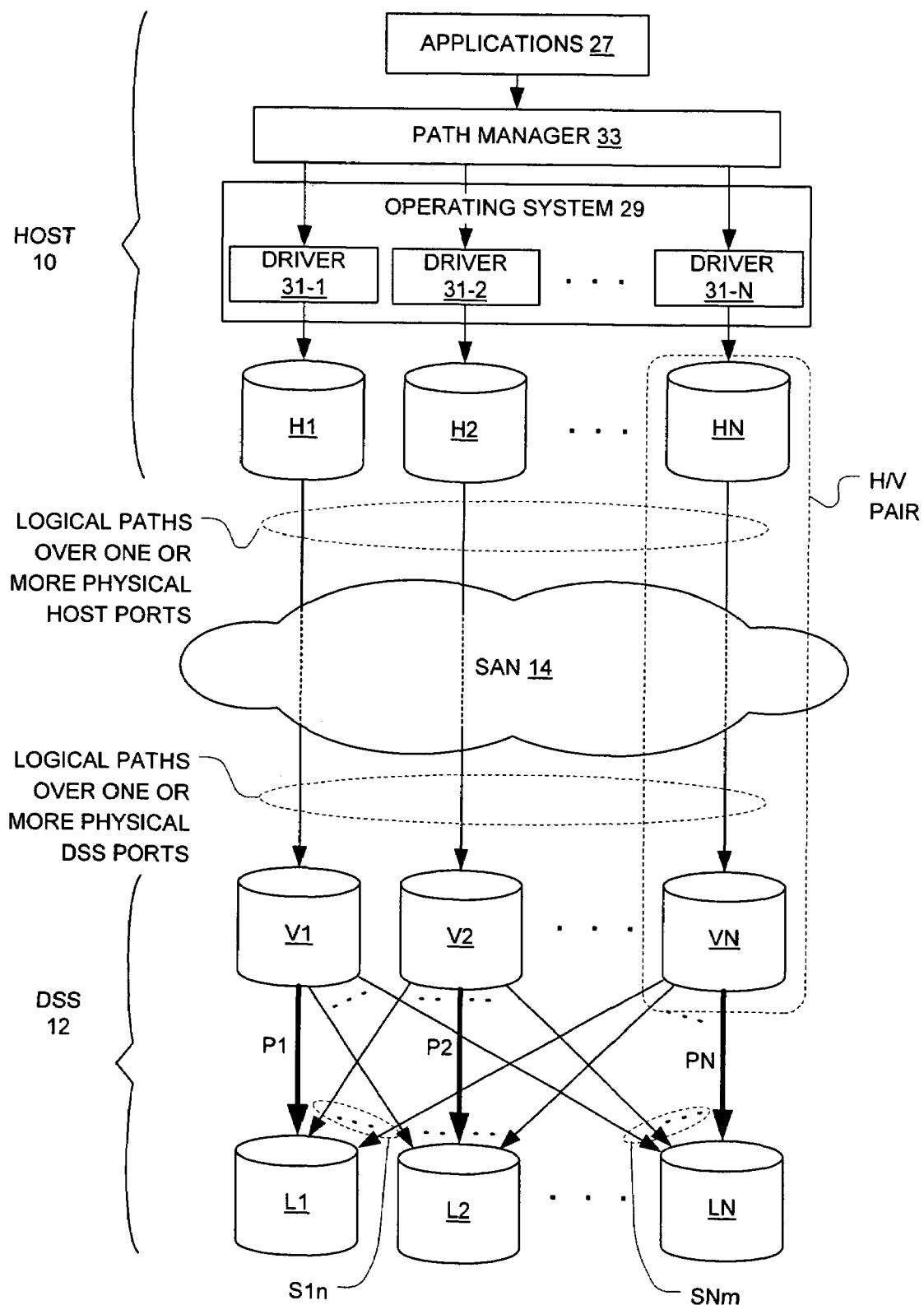
FIG. 4 is a block diagram showing the use of a volume matrix for handling data storage operations in the computer system of FIG. 1.

FIG. 4 shows an arrangement employing a "volume matrix" to reduce the performance impact of the queuing of storage requests within a host 10. For a set of logical devices L1, L2, . . . , LN, a corresponding set of host devices H1, H2, . . . , HN and a corresponding set of virtual devices V1, V2, . . . , VN are defined. Each host device Hn forms a host device/virtual device (H/V) pair with its associated virtual device Vn (e.g., H1/V2, H2/V2, etc.). Each host device Hn has a user-visible address range that is mapped to the entire address range of the corresponding logical device Ln. Thus, the application programs 27 of the host 10 see a plurality of host devices (e.g. H1, H2, etc.) for which the physical storage resides on the DSS 12 as corresponding logical devices (e.g. L1, L2 etc.). The applications 27 access the host devices Hn via corresponding device drivers 31-n (31-1, 31-2, etc.) of the operating system 29. Although not shown in FIG. 4, each host device Hn also has a corresponding storage request queue for storing pending storage requests, as describe in further detail below.

In addition, the host devices Hn also have additional address ranges that are user-hidden (i.e., not user-visible), and an association is created between these user-hidden address ranges and the logical devices Ln. In this manner, any particular logical device Ln (e.g. L1) is accessible not only via the user-visible address region of a corresponding host device Hn (e.g. H1), but also via one or more user-hidden address regions of other host devices Hn (e.g., H2, H3, etc.). In the present description, the former type of access is said to use a "primary" path Pn (P1 for L1, P2 for L2, etc.) and the latter type of access is said to use a "secondary" path 5 nm (e.g., S12, . . . , S1N for L1, S21, . . . , S2N for L2, etc.). The use of these primary and secondary paths in carrying out storage requests is managed by a path manager 33 in the host 10 as described in more detail below. It will be noted that there are potentially as many as N−1 secondary paths for each logical device Ln. In practice, it may or may not be advantageous to employ all of the potential secondary paths. The secondary paths may be created and utilized dynamically, in which case a set of secondary paths 5 nm may be created incrementally over time based on the workload and operating conditions of the computer system.

Figure 5:
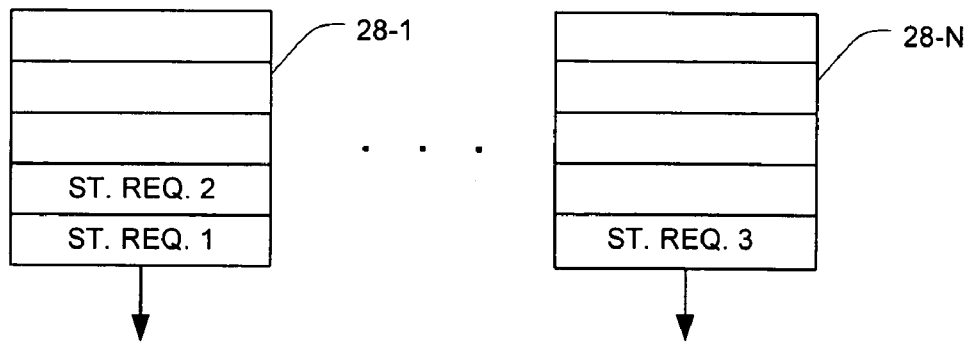
FIG. 5 is diagram showing storage request queues used with the volume matrix of FIG. 4.

FIG. 5 shows a set of request queues 28 (28-1, 28-2, . . . , 28-N) that reside in the operating system 29 of FIG. 4, each queue 28-n being used for storage requests directed to a corresponding host device Hn. In an example situation shown in FIG. 5, three storage requests that are directed to logical device L1 are distributed among the queues 28 to take advantage of the availability of the secondary paths. Storage requests 1 and 2 are on the queue 28-1 for host device H1, and thus will access the data of logical device L1 via its primary path P1 (FIG. 4) which includes the user-visible region of host device H1. Storage request 3 is shown on the queue 28-N for host device HN, and it will access the data of logical device L1 via a secondary path S1N (FIG. 4) which includes a user-hidden region of host device HN. Again, the nature of the secondary path accesses, along with specific examples, are described below.

Figure 6:
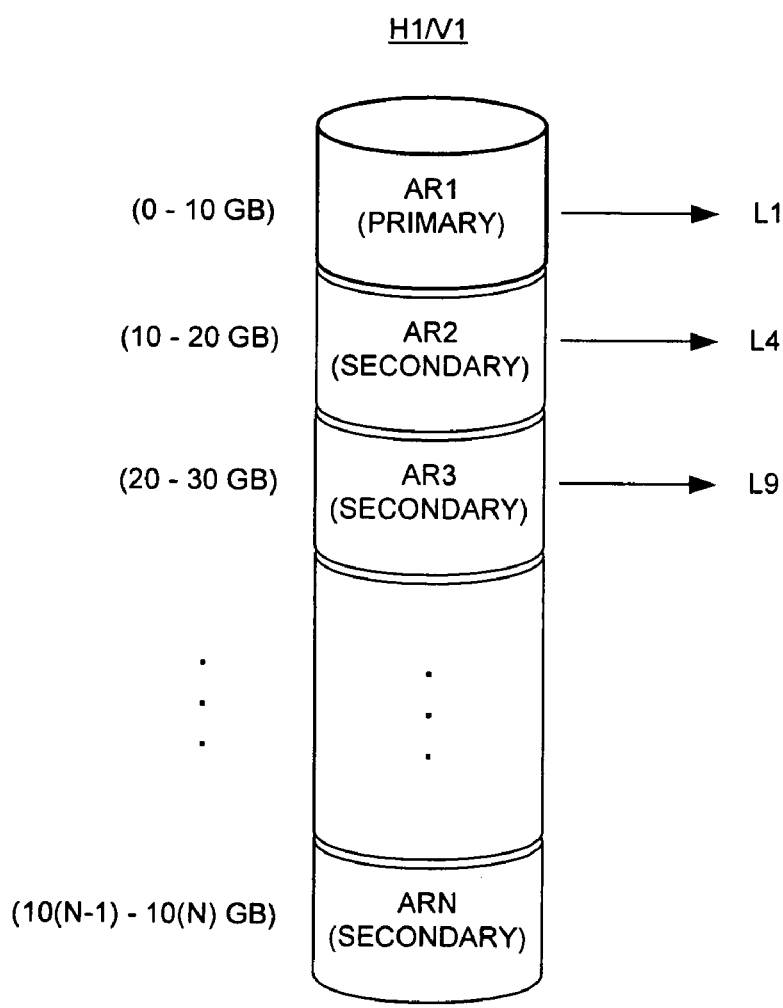
FIG. 6 is a diagram depicting the structure of host and virtual storage devices and mappings to logical storage devices in the volume matrix of FIG. 4.

FIG. 6 shows the logical structure of a host device Hn (e.g. H1 as shown) as well as its associated a virtual device Vn (e.g. V1) of the same H/V pair (H1/V1) and their relationship to the logical devices L1 . . . LN. The devices Hn and Vn are partitioned into a set of address ranges AR1, AR2, . . . , ARN, each of which spans 10 GB in the illustrated example. In the illustrated embodiment, the first address range AR1 of all host and virtual devices Hn and Vn is a user-visible, primary address range reserved for direct access to a corresponding one of the logical devices Ln for which the host/virtual device pair is part of the primary path. Thus for the host/virtual device pair H1/V1, the address range AR1 is mapped to logical device L1 and forms part of its primary path P1.

Additional address ranges AR2, AR3, . . . , ARN are secondary address ranges mapped to different logical devices Ln. In the illustrated example, address range AR2 of H1/V1 is mapped to logical device L4, and address range AR3 to logical device L9. Each of the address ranges AR2, AR3, . . . , ARN is user-hidden, i.e., an application program 27 within a host 10 cannot legally generate storage addresses falling in any of these ranges for the host/virtual device pair H1/V1. Rather, addresses in these ranges are generated as part of the operation of the path manager 33 as described in more detail below. The Path Manager 33 is an appropriate place to enforce the user-invisibility of the secondary address ranges, but this function may be performed elsewhere.

It will be appreciated that at any given time during operation of the system of FIG. 4, mappings for each host/virtual device pair Hn/Vn corresponding to logical devices Ln are defined. Table 1 below provides a general example of such mappings. According to Table 1, each host device Hi is mapped to a user-visible primary address range AR1 of a corresponding host/virtual device pair Hi/Vi, as well as to one or more user-hidden secondary address ranges of other host/virtual device pairs Hj/Vj (j≠i). Thus host device H2, for example, is mapped to address range AR1 of host/virtual device pair H2/V2, as well as to address range AR2 of host/virtual device pair H1/V1, address range AR3 of host/virtual device pair HN/VN, etc. Each set of address ranges for a given host Hi is in turn mapped to the corresponding logical device Li, which appears in the same row of Table 1.

TABLE 1

|     | H1/V1 | H2/V2 | ... | HN/VN |     |
|-----|-------|-------|-----|-------|-----|
| H1: | AR1   | AR4   |     | AR2   | :L1 |
| H2: | AR2   | AR1   | ... | AR3   | :L2 |
| .   | .     | .     |     | .     | .   |
| .   | .     | .     |     | .     | .   |
| .   | .     | .     |     | .     | .   |
| HN: | ARN   | ARN   |     | AR1   | :LN |

Figure 7:
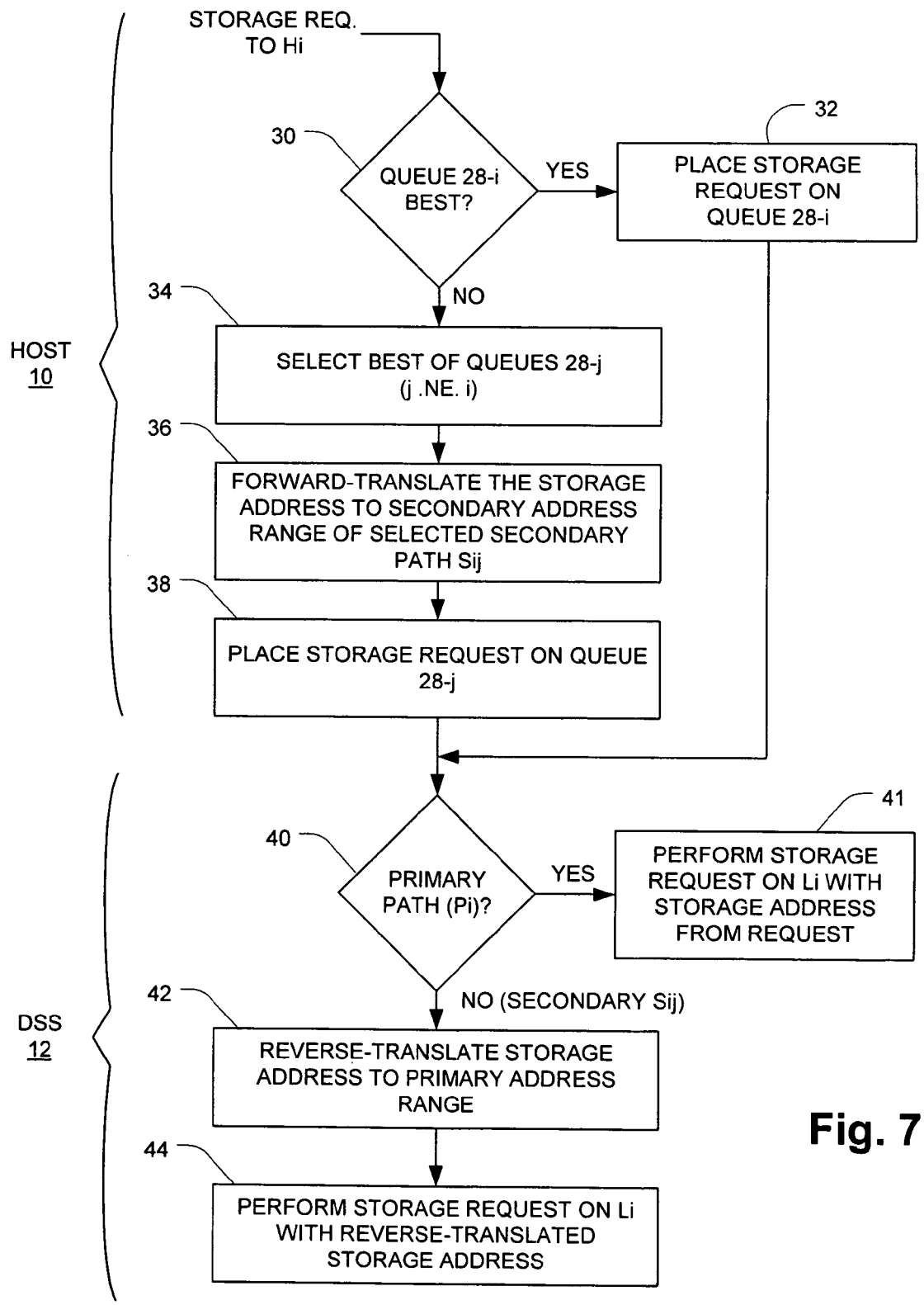
FIG. 7 is a flow diagram generally illustrating a process for performing data storage operations utilizing the volume matrix of FIG. 4.

FIG. 7 illustrates the operation of the volume matrix method when a storage request is generated at a host 10. As indicated, the method is divided into one part performed at the host 10, specifically by the path manager 33 (FIG. 4), and another part performed at the DSS 12 on which the data for the storage operation is located. It is assumed that the storage request is directed to a host device designated Hi (i=1, 2, . . . , N) and intended for the corresponding target logical device Li.

At step 30 of the method of FIG. 7, it is determined whether the queue 28-i for host device Hi is the best queue to use from a performance perspective. This might be the case, for example, if the queue 28-i at the present moment is empty or has no more than some predetermined number of entries. Other criteria may be employed as might be desired. One example of such a criteria is the number of I/Os in any queue 28 for the host device Hi (which represents paths to multiple logical devices). Another possible criteria is the size of the I/Os already in those queues. Another is the average response time for each queue, to allow the load to be balanced to correct for uneven performance. A fourth criteria may include the identity of the DSS that a given virtual device Vi points to, because sending multiple I/Os for a given Ln through the same DSS hardware port may provide increased performance. Finally, the existence of user-hidden access to the logical device Lx having been already created on the Hi/Vi pair will be important, since creating these relationships requires additional communication between the path management software and the DSS.

If at step 30 it is determined that the queue 28-i is the best queue, then at step 32 the storage request is placed on the queue 28-i for processing in the normal fashion. This includes forwarding of the storage request to the DSS 12, as is normally performed by the device driver 31-i and known mechanisms within the SAN 14. In this manner, the storage request is directed along the primary path Pi for the target logical device Li.

If at step 30 it is determined that the queue 28-i is not the best queue, then at step 34 the best of the other queues 28-j (j≠i) is selected based on the same or similar criteria as used in step 30. This selection of an alternative queue is equivalent to selecting a desired secondary path Sij to the target logical device Li.

At step 36, the address of the storage request is forward-translated to the appropriate secondary address range using the mappings such as illustrated in FIG. 6 and Table 1 above. In the illustrated embodiment in which the original storage address always falls within the first address range AR1, this translation may be accomplished by simply adding an offset value representing the beginning (i.e. first address) of the target secondary address range. A specific example is given below to further illustrate this forward-translation.

At step 38, the storage request is placed on the selected queue 28-j for processing in the normal fashion. In this manner, the storage request is directed along the selected secondary path Sij.

The remaining steps of FIG. 7 illustrate the pertinent processing of the storage request when received by a DSS 12. At step 40, it is determined whether the storage request was received on a primary path Pi (i.e., at virtual device Vi with a storage address falling in the primary address range AR1). If so, then at step 41 the storage request is performed on the corresponding target logical device Li using the storage address from the storage request (i.e., untranslated). If it is determined in step 40 that a secondary path Sij has been utilized, then at step 42 the storage address from the storage request is reverse-translated back to into the primary address range AR1 such that it can be used to access the target logical device Li, and at step 44 the storage request is performed on the target logical device Li using the reverse-translated storage address. The target logical device Li is identified by performing a content-based lookup on a mapping structure such as Table 1, for example. The identity of the virtual device Vj and the address range into which the storage address from the storage request falls are used to identify a matching entry in the mapping structure, which entry is mapped to a particular logical device Li by the same mapping structure. As an example using Table 1, the virtual device V2 and address range AR4 identify the entry in the first row and second column of Table 1, and thus such a combination identifies the logical device of the first row (L1) as the target logical device. The process of reverse-translating the storage address back to AR1 is the reverse of the translation of step 36, e.g., in the illustrated embodiment, subtracting the offset value representing the beginning (first address) in the address range of the storage request.

It will be appreciated that in the case of a data read operation or other operation for which the host 10 expects a response, the DSS 12 must return such a response via whichever path the storage request has been received, i.e., the primary path or the appropriate secondary path. The DSS maintains the identity of the path in association with the storage request as it is performed on the logical device Li, and uses this information at the completion of the operation to create the correct response transaction to the host 10.

In the above description, the first address range AR1 of each host Hn serves as the primary address range for the corresponding logical device Ln. This configuration has certain advantages including predictability and simplicity. In alternative embodiments, it may be desirable to utilize a more arbitrary or device-specific primary address range instead of a globally fixed address range such as address range AR1. That is, the primary path for a given logical device Ln may utilize a primary address range other than address range AR1 of the corresponding H/V pair, and the identity of the primary address range may be different for different H/V pairs. In such a case, the operation will differ slightly from that shown in FIG. 7. Specifically, the respective translations of steps 36 and 42 may require a table lookup or similar action rather than the simple adding/subtracting of an offset.

Additionally, although the method of FIG. 7 employs "forward" and "reverse" address translations, in alternative embodiments the respective first and second translations performed at the host 10 and DSS 12 may not be exact inverses of each other. Below is an example illustrating both a "reverse" second translation and another example with an alternative second translation yielding a similar result.

EXAMPLE I

"Reverse" Second Translation

1. Original request to address 0x1000 on H7 (primary host device for logical device L7, which corresponds to a physical disk)
2. First (forward) translated to address 0xC00000 on H15 (a secondary host device for logical device L7)
3. Second (reverse) translated in DSS back to address 0x1000 for logical device L7

EXAMPLE II

Alternative Second Translation

1. Same original host request, but device L7 is defined as a range of addresses beginning at address 0xA000000 of a physical disk drive BF
2. Same first translation to address 0xC01000 on H15
3. Second translation to device BF and address 0xA001000 (i.e., the address at offset 0x1000 within the range of addresses beginning at 0xA000000 that define L7)

Figure 8:
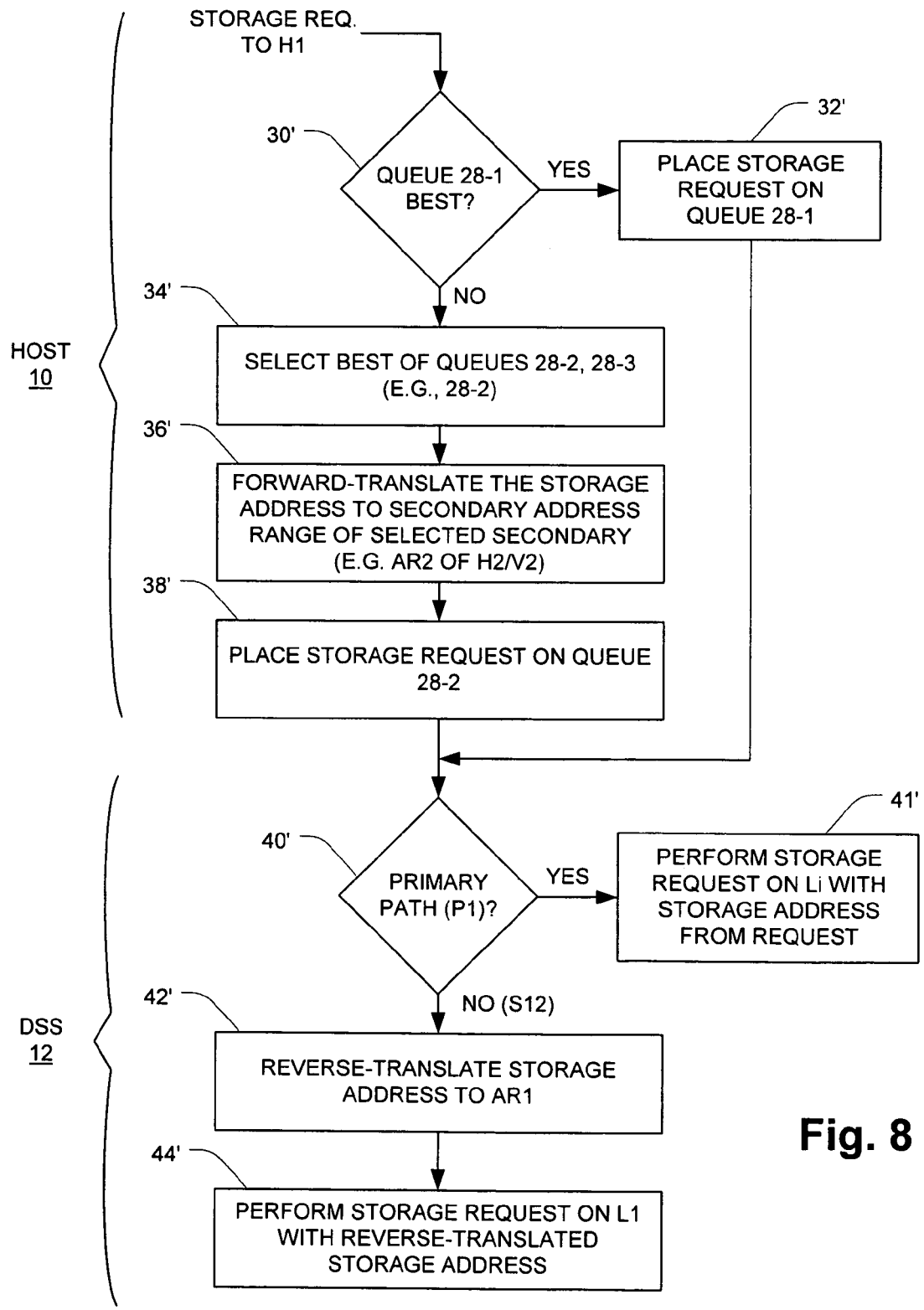
FIG. 8 is a flow diagram for a particular example of the process of FIG. 7.

FIG. 8 shows a specific simplified example of the method of FIG. 7. The example is based on the set of mappings shown in Table 2 below:

TABLE 2

|     | H1/V1 | H2/V2 | H3/V3 |     |
|-----|-------|-------|-------|-----|
| H1: | AR1   | AR2   | AR2   | :L1 |
| H2: | AR2   | AR1   | AR3   | :L2 |
| H3: | AR3   | AR3   | AR1   | :L3 |

Referring to FIG. 8, in step 30' it is determined whether the queue 28-1 is the best for a storage request directed to host H1. If so, at step 32' the storage request is placed on the queue 28-1. If not, then at step 34' the best of queues 28-2 and 28-3 is selected, in this case queue 28-2. At step 36' the storage address is forward-translated to the correct address range AR2 of the secondary pair H2/V2. Then at step 38' the storage request is placed on the queue 28-2.

Upon receiving the storage request, the DSS 12 at step 40' determines whether the storage request has been received via a primary path by determining which address range the storage address falls into. In this case, because the storage address falls into address range AR2 and not address range AR1, a secondary path rather than the primary path has been used. Then in step 42' the storage address from the storage request is reverse-translated back into the primary address range AR1 such that it can be used to access the target logical device L1, and at step 44' the storage request is performed on the target logical device L1 using the reverse-translated storage address. The target logical device L1 is identified in the manner described above with reference to FIG. 7.

The path manager 33 may be operative to establish secondary paths either in a static manner, in advance of any specific storage requests, and/or in a more dynamic manner in response to storage requests. The path manager 33 negotiates with each DSS 12 for the alternate address mappings of the secondary paths. The nature of the negotiation may vary across different implementations. As an example, the path manager 33 might use the SCSI 'mode select' command to request a new virtual mapping to be creates. The same command can also be used to delete a previously created mapping. Using a SCSI 'mode sense' command, the path manager 33 can validate the mapping that is active in the DSS 12.

When a dynamic path-establishment technique is used, the path manager 33 examines the sizes of the host queues 28 (or other performance criteria) at the time a storage request is generated by an application 27 to determine whether it would be best to (1) use the primary path, (2) use an existing secondary path if any, or (3) create and use a new secondary path. The latter approach might be chosen, for example, if there is a host device that is relatively idle in comparison to the primary host device for the request. In this case, the path manager 33 performs the following actions:

1. Select a host device Hn and address range ARn for the new secondary path
2. Make appropriate entries in the mapping structure at the host computer 10 (e.g., table like Table 1)
3. Inform the DSS 12 of the creation of the new secondary path and the host device Hn and address range ARn that it utilizes as well as the target logical device Ln The DSS 12 maintains the information from the path manager 33 for use when processing storage requests received from the host computer 10. After the above actions have been performed, the new secondary path is available for use in processing storage requests, including the storage request that prompted the creation of the new secondary path.

It will be appreciated that in the case of dynamic creation of secondary paths, it may be beneficial to employ a mechanism for tearing the paths down according to some schedule or criteria so as to avoid wasting system resources. Such a mechanism might employ a simple time-out, for example, or something more sophisticated such as a supervisory function that monitors the utilization of the secondary paths and tears them down when utilization is below some predetermined threshold.

The volume matrix technique disclosed herein can have a beneficial impact on storage-related performance of a computer system. In the above-mentioned case of a first storage request that is a cache miss followed by a second storage request that is a cache hit, for example, if the first storage request is residing in the queue 28 for the primary host device Hi when the second storage request is generated, the path manager 33 may direct the second storage request to a secondary path whose host device Hj is immediately available. The second storage request is routed to the target logical device Li via the secondary path Sij, and under the assumption of a cache hit, the second storage request can be completed in the cache even if the target disk device is still busy handling the cache miss for the first storage request. The performance of the second storage request has not been adversely affected by the preceding cache miss.

More generally, the volume matrix technique can improve storage performance whenever a storage request can benefit from using a secondary path to a target logical device. The presence of a cache that may contain the data for a request, such that it is unnecessary for the request to wait for a busy disk drive to become free, is only one example. There may be many reasons for a given storage request to be delayed during processing at the DSS 12 or between the host 10 and DSS 12 while a subsequent storage request to the same logical device can receive faster processing. In these cases, the subsequent storage request may indeed receive such faster processing if routed along a secondary path, and thus it is desirable to do so in order to achieve higher system performance.

It should be noted that the DSS 12 may be capable of presenting virtual devices (Vi) to a host 10 (as Hi) for purposes other than providing storage to the host 10. For example, some virtual devices are used for array control software to provide 'in-band' communication to the array (i.e., sending non-I/O commands to the array over I/O channels, rather than across a separate IP connection or other link). Such devices allow this sort of communication to work without becoming a part of the I/O queues for the virtual devices that are providing actual data access to the host. Such devices are referred to as "dummy" devices, and may participate in the multiple-path technique disclosed herein. More generally, a dummy device may be created solely for purposes of the volume matrix, i.e., have no other function such as providing primary access to a logical device Li or even for in-band communications.

Although in the above description the respective numbers of host devices Hn, virtual devices Vn and logical devices Ln are all equal, in general there is no need for all of these to be equal. For example, if a DSS 12 has a single logical device L that a host 10 is allowed to access, there would be a single host queue 28 on that path. By adding several dummy virtual devices Vi such as described above, the path manager 33 could utilize the dummy devices to provide additional queues 28 for the one host device H. This would create a 1-to-N map. In a second example, a DSS 12 may have 40 virtual devices Vi to present to a given host 10 across four channels. Rather than presenting the host 10 with 40 virtual devices on each channel, it may present only ten on each. The path manager 33 could then negotiate for the Hi/Vi pairs to have additional address mappings for devices that are not present on the same host path, but are already available to that host 10 on another path from the same DSS 12. In this case, each of the ten host devices on a path might have maps to up to 40 logical devices. In either case, the only change is in building the address maps—the usage of the logical devices and maps does not change from a 1:1 map.

It should be further noted that alternative embodiments may employ extensions that can be made to the SCSI command set to enable a storage request to include an identifier or address of the logical device within the array that the storage request is intended for. In this case, there is still a volume matrix as described above, but its structure is not explicitly stored and utilized as part of the address range or offset of a host device. Rather, storage requests are routed to logical devices Li based on the information identifying the target device in each storage request. Such alternative embodiments may employ other aspects of the technique as disclosed herein, including the ability to direct storage requests to any of multiple host queues 28, multiple paths to logical devices, etc.

Those skilled in the art will appreciate that embodiments and variations of the present invention other than those explicitly disclosed herein are possible. It is to be understood that modifications to the methods and apparatus disclosed herein are possible while still achieving the objectives of the invention, and such modifications and variations are within the scope of this invention. Accordingly, the scope of the present invention is not to be limited by the foregoing description of embodiments of the invention, but rather only by the claims appearing below.

What is claimed is:

1. A method of performing data storage operations between a host computer and a data storage system, comprising:

establishing a volume matrix including respective pluralities of host devices on the host computer and virtual devices and logical devices on the data storage system, each host device being mapped to a corresponding virtual device creating a corresponding host device/virtual device (H/V) pair, each H/V pair having a user-visible primary address range by which it serves as a primary H/V pair on a primary path for a corresponding one of the logical devices, and each of selected H/V pairs also having one or more user-hidden secondary address ranges and serving as a secondary H/V pair on a respective secondary path for a corresponding other of the logical devices;

at the host computer upon occurrence of a storage request directed to a primary H/V pair for a target logical device, (a) directing the storage request along a selected one of the primary path and secondary paths to the target logical device based on expected performance criteria, and (b) upon directing the storage request along a selected secondary path, performing a first translation of the storage address to the secondary address range of the H/V pair of the selected secondary path; and at the data storage system in response to receiving the storage request from the host computer, (a) if the storage request was received on the primary path for the target logical device, then performing the storage request on the target logical device using the storage address of the storage request, and (b) if the storage request was received on the selected secondary path for the target logical device, then (i) performing a second translation of the storage address of the storage request to an address range of the target logical device, and (ii) performing the storage request on the target logical device using the translated storage address.

2. A method according to claim 1, wherein each H/V pair is associated with a corresponding storage request queue, and wherein the expected performance criteria includes the depths of the respective storage request queues associated with the H/V pairs of the primary and secondary paths.

3. A method according to claim 1, wherein performing the first translation of the storage address comprises adding an offset corresponding to a first address in the secondary address range, and wherein performing the second translation of the storage address comprises subtracting the offset from the storage address of the storage request.

4. A method according to claim 1, wherein the primary address range for each of the H/V pairs comprises a predetermined range of the lowest storage addresses of the H/V pair.

5. A method according to claim 1, wherein:

each H/V pair is associated with a corresponding storage request queue;

the storage request is a second storage request preceded by a first storage request to the primary address range of the H/V pair mapped to the target logical device, the first storage request occupying the storage request queue associated with the primary H/V pair for the target logical device and experiencing a delay that would be added to the delay experienced by the second storage request if it were directed along the primary path to the logical device; and based on the presence of the first storage request in the storage request queue associated with the primary H/V pair for the target logical device, the second storage request is directed along the secondary path to the target logical device.

6. A method according to claim 5, wherein:
the data storage system includes a cache such that any given storage request experiences a cache hit when the data for the storage request is present in the cache and experiences a cache miss when the data for the storage request is not present in the cache; and
the delay being experienced by the first storage request is due to experiencing a cache miss.

7. A method by which a host computer processes data storage operations directed to a data storage system, comprising:
participating with the data storage system in establishing a volume matrix including respective pluralities of host devices on the host computer and virtual devices and logical devices on the data storage system, each host device being mapped to a corresponding virtual device creating a corresponding host device/virtual device (H/V) pair, each H/V pair having a user-visible primary address range by which it serves as a primary H/V pair on a primary path for a corresponding one of the logical devices, and each of selected H/V pairs also having one or more user-hidden secondary address ranges and serving as a secondary H/V pair on a respective secondary path for a corresponding other of the logical devices; and
upon occurrence of a storage request directed to a primary H/V pair for a target logical device, (a) directing the storage request along a selected one of the primary path and secondary paths to the target logical device based on expected performance criteria, and (b) upon directing the storage request along a selected secondary path, translating the storage address to the secondary address range of the H/V pair of the selected secondary path.

8. A method by which a data storage system carries out data storage operations generated in a host computer, comprising:
participating with the host computer in establishing a volume matrix including respective pluralities of host devices on the host computer and virtual devices and logical devices on the data storage system, each host device being mapped to a corresponding virtual device creating a corresponding host device/virtual device (H/V) pair, each H/V pair having a user-visible primary address range by which it serves as a primary H/V pair on a primary path for a corresponding one of the logical devices, and each of selected H/V pairs also having one or more user-hidden secondary address ranges and serving as a secondary H/V pair on a respective secondary path for a corresponding other of the logical devices; and
in response to receiving the storage request from the host computer, (a) if the storage request was received on the primary path for the target logical device, then performing the storage request on the target logical device using the storage address of the storage request, and (b) if the storage request was received on a secondary path for the target logical device, then (i) translating the storage address to an address range of the target logical device, and (ii) performing the storage request on the target logical device using the translated storage address.

9. A computer system, comprising:
a host computer; and
a data storage system coupled to the host computer; wherein:
the host computer and data storage system are cooperative to establish a volume matrix including respective pluralities of host devices on the host computer and virtual devices and logical devices on the data storage system, each host device being mapped to a corresponding virtual device creating a corresponding host device/virtual device (H/V) pair, each H/V pair having a user-visible primary address range by which it serves as a primary H/V pair on a primary path for a corresponding one of the logical devices, and each of selected H/V pairs also having one or more user-hidden secondary address ranges and serving as a secondary H/V pair on a respective secondary path for a corresponding other of the logical devices;
the host computer is operative upon occurrence of a storage request directed to a primary H/V pair for a target logical device (a) to direct the storage request along a selected one of the primary path and secondary paths to the target logical device based on expected performance criteria, and (b) upon directing the storage request along a selected secondary path, to perform a first translation of the storage address to the secondary address range of the H/V pair of the selected secondary path; and
the data storage system is operative in response to receiving the storage request from the host computer (a) if the storage request was received on the primary path for the target logical device, to perform the storage request on the target logical device using the storage address of the storage request, and (b) if the storage request was received on the selected secondary path for the target logical device, then (i) to perform a second translation of the storage address of the storage request to an address range of the target logical device, and (ii) to perform the storage request on the target logical device using the reverse-translated storage address.

10. A computer system according to claim 9, wherein each H/V pair is associated with a corresponding storage request queue in the host computer, and wherein the expected performance criteria includes the depths of the respective storage request queues associated with the H/V pairs of the primary and secondary paths.

11. A computer system according to claim 9, wherein the host computer is operative when performing the first translation of the storage address to add an offset corresponding to a first address in the secondary address range, and wherein the data storage system is operative when performing the second translation of the storage address to subtract the offset from the storage address of the storage request.

12. A computer system according to claim 9, wherein the user-visible address range for each of the H/V pairs comprises a predetermined range of the lowest storage addresses of the H/V pairs.

13. A computer system according to claim 9, wherein:
each H/V pair is associated with a corresponding storage request queue;
the storage request is a second storage request preceded by a first storage request to the primary address range of the H/V pair mapped to the target logical device, the first storage request occupying the storage request queue associated with the primary H/V pair for the target logical device and experiencing a delay that would be added to the delay experienced by the second storage request if it were directed along the primary path to the logical device; and based on the presence of the first storage request in the storage request queue associated with the primary H/V pair for the target logical device, the second storage request is directed along the secondary path to the target logical device.

14. A computer system according to claim 13, wherein:
the data storage system includes a cache such that any given storage request experiences a cache hit when the data for the storage request is present in the cache and experiences a cache miss when the data for the storage request is not present in the cache; and
the delay being experienced by the first storage request is due to experiencing a cache miss.

15. A host computer operative to perform a method of processing data storage operations directed to a data storage system, the method comprising:
participating with the data storage system in establishing a volume matrix including respective pluralities of host devices on the host computer and virtual devices and logical devices on the data storage system, each host device being mapped to a corresponding virtual device creating a corresponding host device/virtual device (H/V) pair, each H/V pair having a user-visible primary address range by which it serves as a primary H/V pair on a primary path for a corresponding one of the logical devices, and each of selected H/V pairs also having one or more user-hidden secondary address ranges and serving as a secondary H/V pair on a respective secondary path for a corresponding other of the logical devices; and
upon occurrence of a storage request directed to a primary H/V pair for a target logical device, (a) directing the storage request along a selected one of the primary path and secondary paths to the target logical device based on expected performance criteria, and (b) upon directing the storage request along a selected secondary path, translating the storage address to the secondary address range of the H/V pair of the selected secondary path.

16. A data storage system operative to perform a method of carrying out data storage operations generated in a host computer, the method comprising:
participating with the host computer in establishing a volume matrix including respective pluralities of host devices on the host computer and virtual devices and logical devices on the data storage system, each host device being mapped to a corresponding virtual device creating a corresponding host device/virtual device (H/V) pair, each H/V pair having a user-visible primary address range by which it serves as a primary H/V pair on a primary path for a corresponding one of the logical devices, and each of selected H/V pairs also having one or more user-hidden secondary address ranges and serving as a secondary H/V pair on a respective secondary path for a corresponding other of the logical devices; and
in response to receiving the storage request from the host computer, (a) if the storage request was received on the primary path for the target logical device, then performing the storage request on the target logical device using the storage address of the storage request, and (b) if the storage request was received on a secondary path for the target logical device, then (i) translating the storage address of the storage request to an address range of the target logical device, and (ii) performing the storage request on the target logical device using the reverse-translated storage address.

17. A method according to claim 1, wherein each of the host devices is a host-oriented logical representation of a unit of data storage physically residing in the data storage system, the host device interacting with a host operating system in the same manner as a local physical disk while hiding underlying details of an interconnection between the host computer and the data storage system.

18. A method according to claim 2, wherein the storage request queue for each of the H/V pairs receives storage requests directed to both (i) the logical device of the H/V pair, and (ii) the other logical devices.

19. A computer system according to claim 9, wherein each of the host devices is a host-oriented logical representation of a unit of data storage physically residing in the data storage system, the host device interacting with a host operating system in the same manner as a local physical disk while hiding underlying details of an interconnection between the host computer and the data storage system.

20. A computer system according to claim 10, wherein the storage request queue for each of the H/V pairs receives storage requests directed to both (i) the logical device of the H/V pair, and (ii) the other logical devices.

* * * * *